(12) United States Patent
Wu

(10) Patent No.: US 9,453,435 B2
(45) Date of Patent: Sep. 27, 2016

(54) CONTROL OF INTERNAL COMBUSTION ENGINE WITH TWO-STAGE TURBOCHARGING

(71) Applicant: GM GLOBAL TECHNOLOGY OPERATIONS LLC, Detroit, MI (US)

(72) Inventor: Ko-Jen Wu, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 121 days.

(21) Appl. No.: 14/508,123

(22) Filed: Oct. 7, 2014

(65) Prior Publication Data

US 2016/0097333 A1    Apr. 7, 2016

(51) Int. Cl.

| | |
|---|---|
| *F02B 33/44* | (2006.01) |
| *F02B 33/00* | (2006.01) |
| *F02D 23/00* | (2006.01) |
| *F01L 1/18* | (2006.01) |
| *F01L 1/047* | (2006.01) |
| *F02B 37/22* | (2006.01) |
| *F02B 37/007* | (2006.01) |
| *F01L 1/344* | (2006.01) |

(Continued)

(52) U.S. Cl.
CPC ............... *F01L 1/047* (2013.01); *F01L 1/344* (2013.01); *F02B 37/007* (2013.01); *F02B 37/22* (2013.01); *F02D 13/0203* (2013.01); *F02D 13/0249* (2013.01); *F02D 41/0007* (2013.01); *F02D 13/0219* (2013.01); *F02D 2041/001* (2013.01)

(58) Field of Classification Search
CPC .. F02D 41/0077; F02D 41/005; F01L 1/047; F01L 1/344; F02B 37/013; F02B 37/007; F02B 37/22

USPC ............ 60/612, 602; 123/562, 90.39, 90.4, 123/90.44
See application file for complete search history.

(56) References Cited

U.S. PATENT DOCUMENTS

| | | | | |
|---|---|---|---|---|
| 4,982,567 | A * | 1/1991 | Hashimoto | ......... F02D 41/0007 60/612 |
| 5,230,320 | A * | 7/1993 | Hitomi | ..................... F01L 1/26 123/90.15 |

(Continued)

FOREIGN PATENT DOCUMENTS

| | | | |
|---|---|---|---|
| FR | 2918710 A1 | * | 1/2009 |
| JP | 61210223 A | * | 9/1986 |
| JP | 05065830 A | * | 3/1993 |

*Primary Examiner* — Thai Ba Trieu
(74) *Attorney, Agent, or Firm* — Quinn Law Group, PLLC

(57) ABSTRACT

An internal combustion engine includes a cylinder block defining a cylinder, a cylinder head, an intake valve, an exhaust valve, and a variable exhaust valve timing mechanism. The engine also includes a turbocharging system configured to pressurize ambient airflow for delivery to the cylinder. The turbocharging system includes a low-flow turbocharger, a high-flow turbocharger, and a flow control device for selectively directing post-combustion gas to the low-flow and high-flow turbochargers. A controller directs the post-combustion gas to the low-flow turbocharger and selects a first predetermined exhaust valve timing when the engine operates below a predetermined speed and above a predetermined load. Alternatively, the controller directs the post-combustion gas to the high-flow turbocharger and selects a second predetermined exhaust valve timing at or above the predetermined engine speed. The first predetermined exhaust valve timing traps less post-combustion gas in the cylinder as compared to the second predetermined exhaust valve timing.

20 Claims, 5 Drawing Sheets

(51) Int. Cl.
*F02D 13/02* (2006.01)
*F02D 41/00* (2006.01)

(56) References Cited

U.S. PATENT DOCUMENTS

| | | | | |
|---|---|---|---|---|
| 5,408,979 A * | 4/1995 | Backlund | ............. | F02B 37/013 60/612 |
| 6,705,259 B1 * | 3/2004 | Sellnau | ............... | F01L 13/0036 123/90.16 |
| 6,810,844 B2 * | 11/2004 | Sellnau | ............... | F01L 13/0036 123/90.16 |
| 7,011,056 B2 * | 3/2006 | Melchior | ................. | F01L 1/26 123/90.15 |
| 7,258,100 B2 * | 8/2007 | Pinkston | ............. | F01L 13/0036 123/90.16 |
| 7,308,872 B2 * | 12/2007 | Sellnau | ............... | F01L 13/0036 123/90.39 |
| 7,540,151 B2 * | 6/2009 | Boehm | ................. | F02B 37/007 60/612 |
| 7,644,586 B2 * | 1/2010 | Yamagata | ............... | F02D 23/00 60/612 |
| 8,011,185 B2 * | 9/2011 | Inoue | ................. | F02D 41/0007 123/90.15 |
| 8,028,525 B2 * | 10/2011 | An | ....................... | F02B 37/013 60/612 |
| 8,191,522 B2 * | 6/2012 | Riley | ................. | F01L 13/0021 123/90.39 |
| 8,201,406 B2 * | 6/2012 | Kogo | ................... | F02B 37/004 60/612 |
| 8,307,649 B2 * | 11/2012 | Axelsson | ............. | F02B 37/013 60/612 |
| 8,499,559 B2 * | 8/2013 | Axelsson | ............. | F02B 37/013 60/612 |
| 8,534,066 B2 * | 9/2013 | Cavallo | ................ | F02B 37/013 60/612 |
| 8,534,244 B2 * | 9/2013 | Riley | ................... | F01L 13/0021 123/90.44 |
| 8,635,869 B2 * | 1/2014 | An | ....................... | F02B 37/007 60/600 |
| 8,720,200 B2 * | 5/2014 | Tsukamoto | ......... | F02D 41/0007 60/612 |
| 8,844,285 B2 * | 9/2014 | An | ....................... | F02B 37/013 60/612 |
| 9,133,795 B2 * | 9/2015 | Riley | ..................... | F01L 1/344 123/90.17 |
| 9,217,363 B2 * | 12/2015 | Riley | ................... | F02B 37/105 60/612 |
| 2007/0074513 A1 * | 4/2007 | Lamb | ................... | F02B 37/013 60/612 |
| 2007/0119168 A1 * | 5/2007 | Turner | ................. | F02B 37/013 60/612 |
| 2009/0248271 A1 * | 10/2009 | Kuzuyama | ......... | F02D 41/0007 701/103 |
| 2010/0282193 A1 * | 11/2010 | Timothy | ................ | F01L 1/047 123/90.17 |
| 2011/0000470 A1 * | 1/2011 | Roth | ................... | F02D 13/0249 123/90.15 |
| 2011/0126519 A1 * | 6/2011 | Okada | ................ | F02D 41/0007 60/276 |
| 2011/0219767 A1 * | 9/2011 | Miyashita | ............... | F01L 1/267 60/600 |
| 2013/0269315 A1 * | 10/2013 | Ervin | ................... | F02D 41/0007 123/90.6 |
| 2015/0184606 A1 * | 7/2015 | Soejima | ............. | F02D 41/0007 123/346 |
| 2015/0204257 A1 * | 7/2015 | Osumi | ................ | F02D 41/0007 60/605.1 |
| 2016/0108798 A1 * | 4/2016 | VanDerWege | ........ | F02B 37/025 60/602 |

\* cited by examiner

CONTROL OF INTERNAL COMBUSTION ENGINE WITH TWO-STAGE TURBOCHARGING

TECHNICAL FIELD

The present disclosure relates to controlling operation of an internal combustion engine with a two-stage turbocharging system.

BACKGROUND

Internal combustion engines (ICE) are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

In an effort to increase overall engine efficiency and response, some ICE's employ two-stage turbocharging systems which include a smaller turbocharger driven by lower exhaust flows and a larger turbocharger driven by higher exhaust flows. A transition between the two turbochargers in such a two-stage system is typically controlled based on the particular engine's configuration and operating requirements.

SUMMARY

One embodiment of the disclosure is directed to an internal combustion engine that includes a cylinder block. The cylinder block defines a cylinder and a cylinder head mounted to the cylinder block. A reciprocating piston is arranged inside the cylinder and a crankshaft is arranged in the cylinder block and rotated by the piston. An intake valve is operatively connected to the cylinder head and configured to control supply of air to the cylinder for combustion therein. An exhaust valve is operatively connected to the cylinder head and configured to control removal of post-combustion gas from the cylinder. The engine also includes a first mechanism configured to provide variable exhaust valve timing, i.e., vary opening and/or closing timing of the exhaust valve. The engine also includes a turbocharging system configured to pressurize an airflow being received from the ambient for delivery to the cylinder. The turbocharging system includes a low-flow turbocharger and a high-flow turbocharger. Each turbocharger is configured to be driven by the post-combustion gas. The turbocharging system also includes a flow control device configured to selectively direct the post-combustion gas to the low-flow and high-flow turbochargers.

The engine additionally includes a controller configured to direct the post-combustion gas to the low-flow turbocharger via the flow control device and select a first predetermined timing for opening the exhaust valve via the first mechanism when the engine operates in a first mode below a predetermined speed and above a predetermined load. The controller is additionally configured to direct the post-combustion gas to the high-flow turbocharger via the flow control device and select a second predetermined timing for opening the exhaust valve via the first mechanism when the engine operates in a second mode at or above the predetermined speed. The first predetermined timing for opening the exhaust valve is intended to trap less post-combustion gas and generate less spark knock in the cylinder as compared to the second predetermined timing for opening the exhaust valve.

The engine may include an exhaust camshaft configured to regulate opening and closing of the exhaust valve. Additionally, the first mechanism may be configured to provide variable exhaust valve timing via at least one of varying opening phasing and opening duration for the exhaust valve.

The first mechanism may also include an exhaust camshaft phaser for regulating the opening phasing for the exhaust valve by changing a position of the exhaust camshaft via the exhaust camshaft phaser relative to a position of the crankshaft.

The exhaust camshaft may include a first cam lobe and a second cam lobe. In such a case, the first cam lobe may provide the first predetermined timing for opening the exhaust valve via a first exhaust valve opening duration and the second cam lobe may provide the second predetermined timing for opening the exhaust valve via a second exhaust valve opening duration.

The first mechanism may additionally include a rocker arm having a first surface configured to actuate the exhaust valve via the first cam lobe and a second surface configured to actuate the exhaust valve via the second cam lobe.

The controller may also be configured to direct the post-combustion gas to the high-flow turbocharger via the flow control device and select the second predetermined timing for opening the exhaust valve via the first mechanism when the engine operates in a third mode below the predetermined speed and below the predetermined load.

The engine may additionally include a second mechanism configured to provide variable intake valve timing, i.e., vary opening and/or closing timing of the intake valve. In such a case, the controller is additionally configured to select a first predetermined timing for opening the intake valve via the second mechanism when the engine operates in each of the first and second modes. Additionally, in such a case, the controller is configured to select a second predetermined timing for opening the intake valve via the second mechanism when the engine operates in the third mode. The first predetermined timing for opening the intake valve is intended to trap less air in the cylinder in the first mode and generate enhanced engine power output in the second mode as compared to the second predetermined timing for opening the intake valve. Such control of the intake valve timing is also intended to generate less knock in the first mode than with the above-described control of the exhaust valve timing alone.

The second mechanism may be configured to provide variable intake valve timing via varying at least one of opening phasing and opening duration for the intake valve.

The engine may include an intake camshaft configured to regulate opening and closing of the intake valve. Additionally, the second mechanism may include an intake camshaft with an intake camshaft phaser in order to regulate the opening phasing for the intake valve by changing a position of the intake camshaft via the intake camshaft phaser relative to a position of the crankshaft.

The second mechanism may be an intake camshaft having a first cam lobe and a second cam lobe. In such a case, the first cam lobe is configured to provide the first predetermined timing for opening the intake valve via a first intake valve opening duration and the second cam lobe is configured to provide the second predetermined timing for opening the intake valve via a second intake valve opening duration.

Another embodiment of the present disclosure is directed to a method of controlling operation of an internal combustion engine by using the controller as described above.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
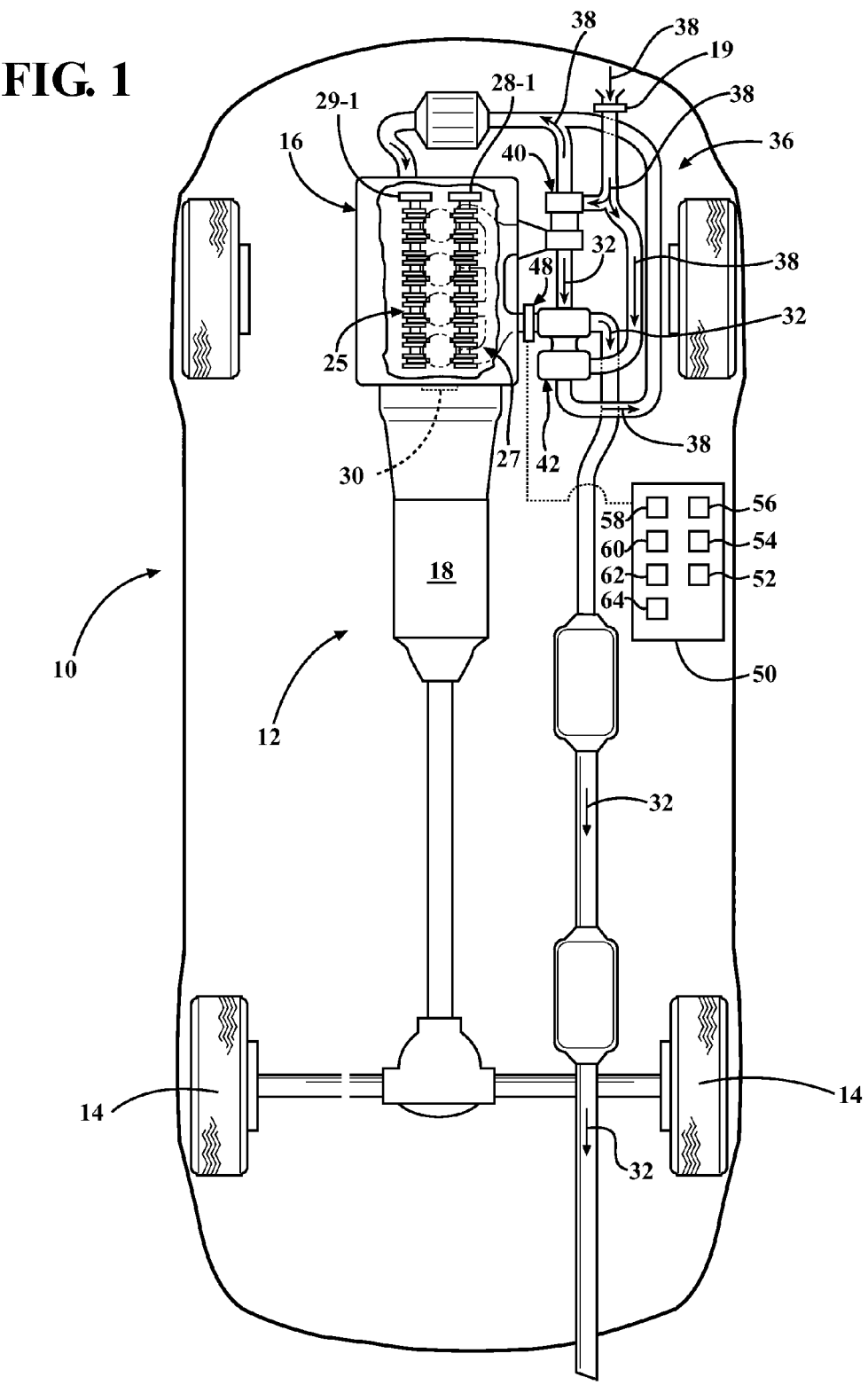
FIG. 1 is a schematic depiction of a vehicle having an engine with a two-stage turbocharging system and variable valve timing according to the disclosure.

Referring to the drawings, wherein like reference numbers correspond to like or similar components throughout the several figures, FIG. 1 illustrates a vehicle 10 employing a powertrain 12 for propulsion thereof via driven wheels 14. As shown, the powertrain 12 includes an internal combustion engine 16, such as a spark- or compression-ignition type, and a transmission assembly 18 operatively connected thereto. The powertrain 12 may also include one or more electric motor/generators, none of which are shown, but the existence of which may be envisioned by those skilled in the art.

Figure 2:
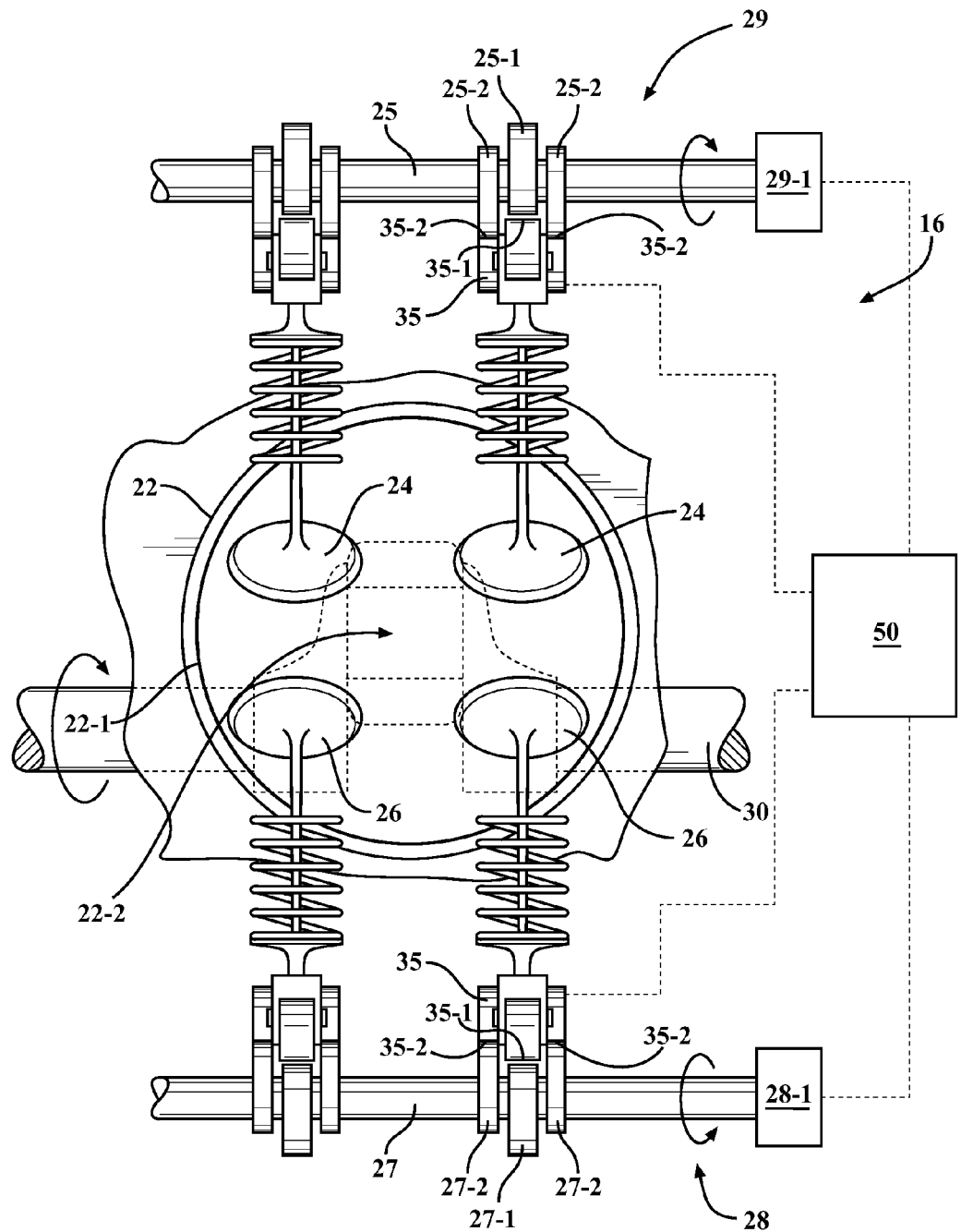
FIG. 2 is a schematic illustration of the engine having a mechanism configured to provide variable valve timing and lift for the engine's intake and exhaust valves.
Figure 3:
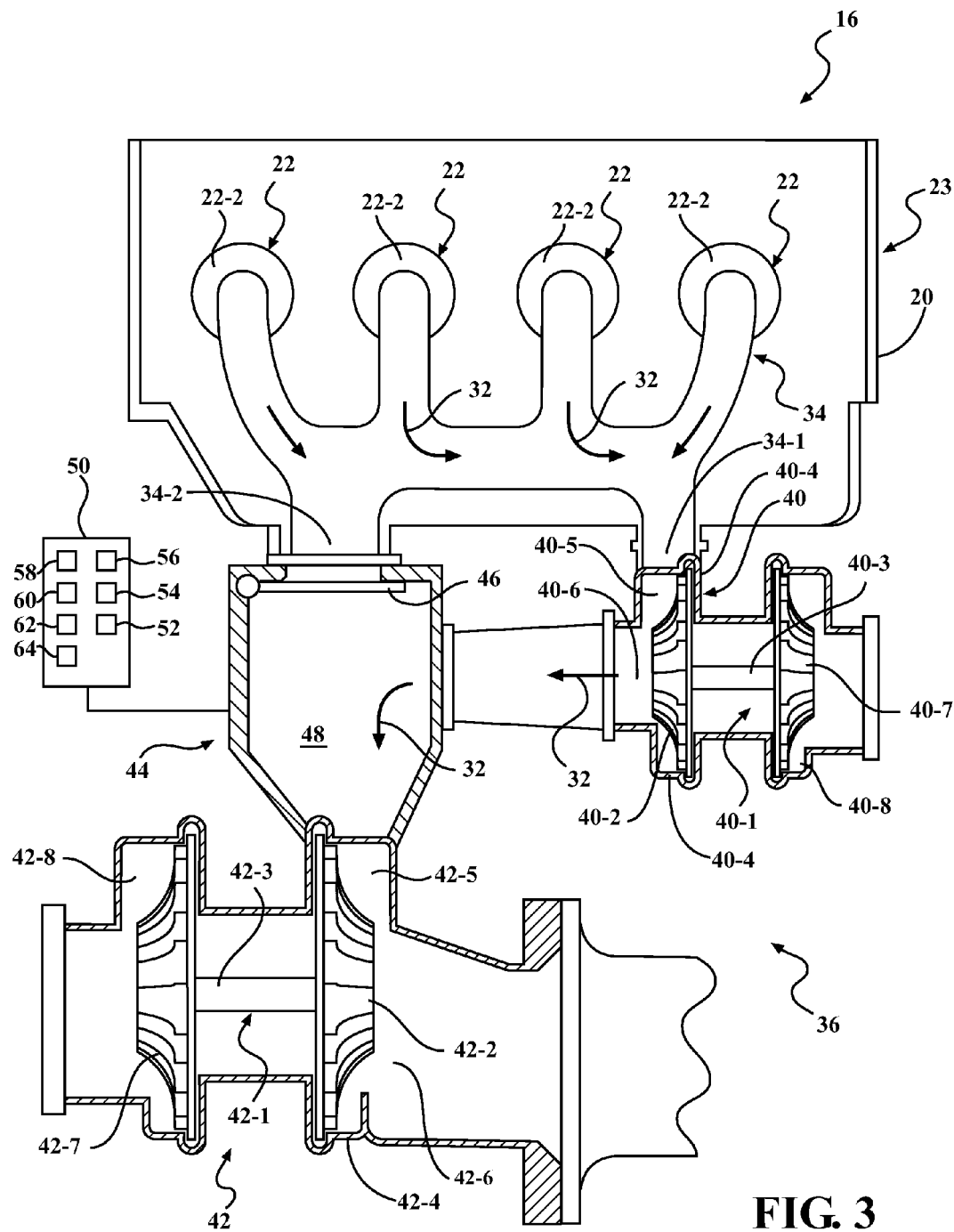
FIG. 3 is a schematic partially cross-sectional top view of an engine with a two-stage turbocharging system and variable valve timing shown in FIG. 1 according to one embodiment of the disclosure.
Figure 4:
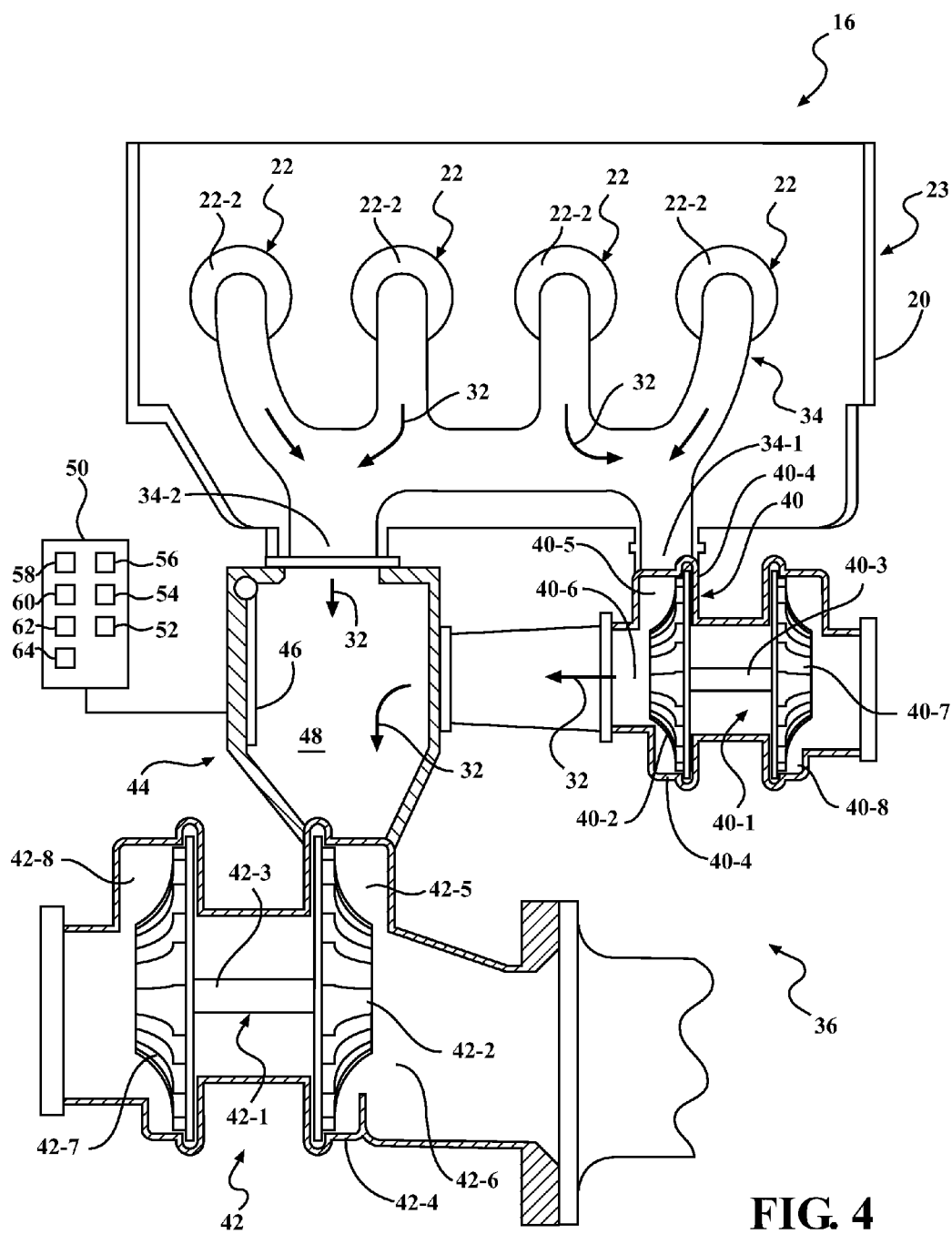
FIG. 4 is a schematic partially cross-sectional top view of an engine with a two-stage turbocharging system shown in FIG. 1 according to another embodiment of the disclosure.

As shown in FIGS. 3-4, the engine 16 includes a cylinder block 20 with a plurality of cylinders 22 arranged therein and a cylinder head 23 that is mounted on the cylinder block. As additionally shown in FIGS. 3-4, the cylinder head 23 may be integrated into or cast together with the cylinder block 20. The cylinder head 23 receives air and fuel as a pre-combustion charge to be used inside the cylinders 22 for subsequent combustion. As can be seen in FIG. 2, each cylinder 22 includes a respective piston 22-1 configured to reciprocate therein. Additionally, combustion chambers 22-2 are formed within the cylinders 22 between the bottom surface of the cylinder head 23 and the tops of the pistons 22-1. As known by those skilled in the art, each of the combustion chambers 22-2 receives fuel and air that are combined to form a fuel-air mixture for subsequent combustion inside the subject combustion chamber. Typically, the engine 16 includes a throttle 19 (shown in FIG. 1), which can be configured as a traditional movable throttle blade or another type of an arrangement that meters a volume of air entering the engine from the ambient. Although an in-line four-cylinder engine is shown in FIGS. 1-4, nothing precludes the present disclosure from being applied to an engine having a different number and/or arrangement of cylinders.

As shown in FIG. 2, the engine 16 also includes a plurality of intake valves 24 operatively connected to the cylinder head 23 and configured to control a supply of air to each cylinder 22 for combustion with fuel therein. An intake camshaft 25 is configured to regulate opening and closing of the respective intake valves 24 during operation of the engine 16. The engine 16 additionally includes a plurality of exhaust valves 26 operatively connected to the cylinder head 23 and configured to control removal of post-combustion gasses from each cylinder 22. An exhaust camshaft 27 is configured to regulate opening and closing of the respective exhaust valves 26 during operation of the engine 16.

With continued reference to FIG. 2, the engine 16 also includes a first mechanism 28 that is configured to provide variable exhaust valve timing, i.e., control of timing for the opening and closing of the exhaust valves 26 in the engine 16. The first mechanism 28 may be configured to provide variable exhaust valve timing via at least one of varying opening phasing and opening duration for the exhaust valves 26. The engine 16 may also include a second mechanism 29 that is configured to provide variable intake valve timing, i.e., control of timing for the opening and closing of the intake valves 24 in the engine 16. Similar to the first mechanism 28, the second mechanism 29 may be configured to provide variable intake valve timing via at least one of varying opening phasing and opening duration for the intake valves 24. The specific embodiments and operation of the respective first and second mechanisms 28, 29 will be discussed in greater detail below.

The engine 10 also includes a crankshaft 30 configured to rotate within the cylinder block 20. As known to those skilled in the art, the crankshaft 30 is rotated by the pistons 22-1 as a result of an appropriately proportioned amount of fuel and air being selectively admitted into the combustion chambers 22-2 via one or more intake valves 24 and burned in the combustion chambers. After the air-fuel mixture is burned inside a specific combustion chamber 22-2, the reciprocating motion of a particular piston serves to exhaust post-combustion gasses 32 from the respective cylinder 22 via one or more exhaust valves 26. The cylinder head 23 is also configured to exhaust post-combustion gasses 32 from the combustion chambers 22-2, such as via an exhaust manifold 34. As shown in FIG. 3, such an exhaust manifold 34 may be internally cast, i.e., integrated, into the cylinder head 23, or be configured as a separate, attachable component for scavenging the exhaust post-combustion gasses 32 from the cylinders 22. According to one embodiment, exhaust runners from different cylinders 22 may also be grouped in the exhaust manifold 34 into two separate outlets, a first outlet 34-1 and a second outlet 34-2. In a different embodiment, exhaust runners from different cylinders 22 may converge in the exhaust manifold 34 into a single outlet (not shown).

An embodiment of the first mechanism 28 may include the exhaust camshaft 27 in combination with an exhaust camshaft phaser 28-1 (shown in FIG. 2). Such an embodiment of the first mechanism 28 is intended to regulate the opening phasing for the exhaust valves 26 by changing a position of the exhaust camshaft 27 via the exhaust camshaft phaser 28-1 relative to a position of the crankshaft 30 during operation of the engine 16. An alternative embodiment of the first mechanism 28 may include the exhaust camshaft 27 having a first set of cam lobes 27-1 and a second set of cam lobes 27-2 (also shown in FIG. 2). The first set of cam lobes 27-1 is configured to provide a first predetermined timing for opening the exhaust valves 26 via a first exhaust valve opening duration, while the second set of cam lobes 27-2 is configured to provide a second predetermined timing for opening the exhaust valves 26 via a second exhaust valve opening duration. As shown, the alternative embodiment of the first mechanism 28 may additionally include a plurality or set of rocker arms 35.

Each rocker arm 35 has a first surface 35-1 configured to actuate one exhaust valve 26 via the respective first cam lobe 27-1 and a second surface 35-2 configured to actuate the exhaust valve via the respective second cam lobe 27-2. The first surface 35-1 of each rocker arm 35 is configured to actuate an individual exhaust valve 26 via the first cam lobe 27-1 and generate a first valve lift profile. Each rocker 35 also has a second surface 35-2 configured to actuate the respective exhaust valve 26 via the second cam lobe 27-2 and generate a second valve lift profile. Accordingly, the alternative embodiment of the first mechanism 28 employs switchable cam lobes 27-1 and 27-2 that selectively activate the exhaust valves 26, and thus vary the lift of the subject exhaust valves.

To generate variable valve lift of each exhaust valve 26, the first surface 35-1 is fixed relative to the exhaust camshaft 27 while the second surface 35-2 is moveable or adjustable relative to the exhaust camshaft. The first lift profile generated by the first surface 35-1 may be lower with reduced valve opening duration as compared to the second lift profile and valve opening duration generated by the second surface 35-2. The first mechanism 28 also includes a plurality of devices, such as individual pins (not shown) that are actuated by oil pressure, configured to select one of the first surface 35-1 and the second surface 35-2 of the rocker arms 35 with which to actuate the exhaust valves 26. By switching between the first surfaces 35-1 and second surfaces 35-2 of the rocker arms 35, the subject devices select a desired lift profile and attendant opening timing for the exhaust valves 26. Accordingly, the exhaust valves 26 are actuated selectively by individual first and second cam lobes 27-1, 27-2 via individual rocker arms 35 to control removal of the post-combustion gas 32 from the respective combustion chambers 22-2. An embodiment of the first mechanism 28 that includes both, the exhaust camshaft phaser 28-1 and the first and second sets of cam lobes 27-1, 27-2 is also envisioned.

Similar to the first mechanism 28, an embodiment of the second mechanism 29 may include the intake camshaft 25 in combination with an intake camshaft phaser 29-1 (shown in FIG. 2). Such an embodiment of the second mechanism 29 is intended to regulate the opening phasing for the intake valves 24 by changing a position of the intake camshaft 25 via the intake camshaft phaser 29-1 relative to a position of the crankshaft 30 during operation of the engine 16. An alternative embodiment of the second mechanism 29 may include the intake camshaft 25 having a first set of cam lobes 25-1 and a second set of cam lobes 25-2 (also shown in FIG. 2). The first set of cam lobes 25-1 is configured to provide a first predetermined timing for opening the intake valves 24 via a first intake valve opening duration, while the second set of cam lobes 25-2 is configured to provide a second predetermined timing for opening the intake valves 24 via a second intake valve opening duration.

Similar to the first mechanism 28, the alternative embodiment of the second mechanism 29 may additionally include a plurality of rocker arms 35. Each such rocker arm 35 can have a first surface 35-1 configured to actuate one intake valve 24 via the respective first cam lobe 25-1 to generate a first valve lift profile and a second surface 35-2 configured to actuate the intake valve via the respective second cam lobe 25-2 to generate a second valve lift profile. Accordingly, similar to the first mechanism 28, the alternative embodiment of the second mechanism 29 may employ switchable cam lobes 25-1 and 25-2 that selectively activate the intake valves 24, and thus vary the lift of the subject intake valves. An embodiment of the second mechanism 29 that includes both the intake camshaft phaser 29-1 and the first and second sets of cam lobes 25-1, 25-2 is also envisioned.

As shown in FIGS. 1 and 3-4, the engine 10 also includes a turbocharging system 36 configured to develop boost pressure, i.e., pressurize an airflow 38 that is received from the ambient, for delivery to the cylinders 22. The turbocharging system 36 is configured as a two-stage forced induction arrangement for the engine 10. The turbocharging system 36 includes a low-flow turbocharger 40 and a high-flow turbocharger 42. Each of the low-flow and high-flow turbochargers 40, 42 is in fluid communication with the exhaust manifold 34 and configured to be driven by the post-combustion gasses 32 therefrom. The low-flow turbocharger 40 may be driven by the post-combustion gasses 32 from the first outlet 34-1, while the high-flow turbocharger 42 may be driven by the post-combustion gasses from the second outlet 34-2. In the alternative, in the embodiment of the exhaust manifold employing a single, the low-flow turbocharger 40 and the high-flow turbocharger 42 may each be driven by the post-combustion gasses 32 from the subject single outlet.

The low-flow turbocharger 40 pressurizes and discharges the airflow 38 to the cylinders 22 at lower flow rates of the post-combustion gasses 32, which are typically generated at lower rotational speeds, such as below approximately 3,000 RPM, of the engine 10. The high-flow turbocharger 42 pressurizes and discharges the airflow 38 to the cylinders 22 at higher flow rates of the post-combustion gasses 32, which are typically generated at intermediate and higher rotational speeds, such as around 3,000 RPM and above, of the engine 10. To support such distinct engine speed ranges and rates of airflow 38, the low-flow turbocharger 40 is typically sized comparatively smaller and thus has a smaller rotating inertia than the high-flow turbocharger 42. As such, the exhaust manifold 34 is operatively connected to the cylinder head 23, and in the case of the exhaust manifold 34 having two separate outlets 34-1, 34-2, the two turbochargers 40, 42 can be mounted generally apart. In the case where both the low-flow and high-flow turbochargers 40, 42 are driven from the single outlet of the exhaust manifold 34, the two turbochargers employ a shared exhaust inlet, as will be described in detail below, and, as a result, are arranged in closer proximity relative to one another.

Generally, in a two-stage forced induction arrangement the output pressure from multiple turbochargers is greater than can be provided by a single turbocharger. Such a two-stage forced induction arrangement may be configured to operate as a sequential system, wherein at least in some, typically higher, engine speed ranges both low- and high-flow turbochargers operate simultaneously, i.e., with operational overlap. A two-stage forced induction arrangement may also be configured to generate boost pressure as a staged system, i.e., where the low- and high-flow turbochargers generate boost pressure in sequence, without any operational overlap. In such two-stage forced induction arrangements, the first, larger flow turbocharger boosts intake air pressure as much as possible, for example to three times the intake pressure, and the subsequent smaller flow turbocharger(s) takes the intake air charge from the previous stage and compresses it further, for example to an additional three times intake pressure, for a total boost of nine times atmospheric pressure.

As shown in FIGS. 3-4, each of the turbochargers 40 and 42 includes a rotating assembly, rotating assembly 40-1 and rotating assembly 42-1, respectively. The rotating assemblies 40-1 and 42-1 include respective turbine wheels 40-2 and 42-2 mounted on shafts 40-3 and 42-3, respectively. The turbine wheels 40-2 and 42-2 are configured to be rotated along with the respective shafts 40-3, 42-3 by post-combustion gasses 32 emitted from the cylinders 22. The rotating assembly 42-1 is physically larger than rotating assembly 40-1 such that the high-flow turbocharger 42 may generate the comparatively higher air flow rates required therefrom. The turbine wheels 40-2 and 42-2 are typically constructed from a temperature and oxidation resistant material, such as a nickel-chromium-based "inconel" super-alloy to reliably withstand temperatures of the post-combustion gasses 32.

The turbine wheels 40-2 and 42-2 are disposed inside respective first or low-flow turbine housing 40-4 and a second or high-flow turbine housing 42-4, that are typically constructed from cast iron or steel. The turbine housings 40-4, 42-4 include appropriately configured, i.e., designed and sized, respective turbine volutes or scrolls. The turbine scrolls of the turbine housings 40-4 and 42-4 receive the post-combustion gasses 32 and direct the gasses to the respective turbine wheels 40-2 and 42-2. The turbine scrolls are configured to achieve specific performance characteristics, such as efficiency and response, of the respective turbocharger 40 and 42. Because the low-flow turbocharger 40 receives post-combustion gasses 32 at lower engine speeds and loads, the temperature of the post-combustion gasses entering the turbine housing 40-4 is typically below 1,560 degrees Fahrenheit. On the other hand, at higher speeds and loads the temperature of the post-combustion gasses 32 entering the turbine housing 42-4 may approach and even exceed 2,000 degrees Fahrenheit. Each of the first turbine housing 40-4 and the second turbine housing 42-4 includes a respective inlet 40-5, 42-5 and a respective outlet 40-6, 42-6. Each of the first and second turbine housings 40-4, 42-4 may also include an integrated waste-gate valve (not shown) to facilitate more precise control over boost pressures generated by the turbocharging system 36, as well as the transition and overlap between operation of the low-flow turbocharger 40 and the high-flow turbocharger 42. However, a flow control device 44 that is described in detail below may serve as a waste-gate for the low-flow turbocharger 40.

Each rotating assembly 40-1, 42-1 also includes a compressor wheel 40-7 and 42-7 mounted on the respective shaft 40-3, 42-3. The compressor wheels 40-7 and 42-7 are configured to pressurize the airflow 38 being received from the ambient for eventual delivery to the cylinders 22. The compressor wheels 40-7 and 42-7 are disposed inside a respective compressor cover 40-8 and 42-8. Each compressor cover 40-8, 42-8 is typically constructed from aluminum and includes a respective compressor volute or scroll. As understood by those skilled in the art, the variable flow and force of the post-combustion gasses 32 influences the amount of boost pressure that may be generated by each compressor wheel 40-7 and 42-7 of the respective turbochargers 40 and 42 throughout the operating range of the engine 16. Each compressor wheel 40-7, 42-7 is typically formed from a high-strength aluminum alloy that provides the compressor wheel with reduced rotating inertia and quicker spin-up response.

The engine 16 additionally includes an induction system that may include an air duct and an air filter upstream of the turbochargers 40, 42 configured to channel the airflow 38 from the ambient to the turbocharging system 36. Although the induction system is not shown, the existence of such would be appreciated by those skilled in the art. Each of the turbochargers 40, 42 may also be fluidly connected to an intake manifold (not shown) that is configured to distribute the pressurized airflow 38 to each of the cylinders 22 for mixing with an appropriate amount of fuel and subsequent combustion of the resultant fuel-air mixture.

As shown in FIGS. 3-4, the turbocharging system 36 also includes a flow control device 44. The flow control device 44 is configured to selectively direct the post-combustion gasses 32 to the low-flow turbocharger 40 and the high-flow turbocharger 42. In the embodiment employing the exhaust manifold 34 with the first outlet 34-1 and the second outlet 34-2, the flow control device 44 may be mounted directly to and be in fluid communication with the second outlet 34-2. The high-flow turbocharger 42 is then mounted to the flow control device 44 and apart from the low-flow turbocharger 40, such that the post-combustion gasses 32 may only access the high-flow turbocharger by first passing through the flow control device. A fluid flow path out of the first manifold outlet 34-1 is maintained unobstructed so as to supply the post-combustion gasses 32 to the low-flow turbocharger 40, while another fluid flow path from the second manifold outlet 34-2 is connected to the flow control device 44. In the alternative embodiment where the exhaust manifold 34 converges at the single outlet, the manifold outlet is in fluid communication with the inlet 40-5 of the first turbine housing 40-4, and the outlet 40-6 of the first turbine housing is in fluid communication with the inlet 42-5 of the second turbine housing 42-4. The embodiment of the turbocharging system 36 employing the exhaust manifold 34 with the single outlet may also include a bypass (not shown) controlled by the flow control device 44 and configured to selectively route the post-combustion gasses 32 to the inlet 40-5 of the first turbine housing 40-4 and to the inlet 42-5 of the second turbine housing 42-4.

The flow control device 44 includes a valve 46 and a chamber 48, and is used to selectively open and close the fluid flow path from the second manifold outlet 34-2 into the high-flow turbocharger 42. The flow control device 44 is also open, i.e., fluidly connected with the first turbine housing 40-4. As shown, the valve 46 may be configured as a door designed to pivot around an axis in order to selectively open and close the flow control device 44. When the flow control device 44 is closed and the valve 46 blocks the second manifold outlet 34-2, the post-combustion gasses 32 naturally flow into the low-flow turbocharger 40. Following the low-flow turbocharger 40, the post-combustion gas 32 is exited from the first turbine housing 40-4 into the second turbine housing 42-4 downstream of the valve 46. On the other hand, because the chamber 48 is fluidly connected to the low-flow turbocharger 40, when the valve 46 fully opens the second manifold outlet 34-2, pressure across the two sides of the first turbine housing 40-4 equalizes and the post-combustion gasses 32 will naturally flow into the second turbine housing 42-4.

The valve 46 can be sized in order to select the operational transition point between low-flow turbine wheel 40-2 and high-flow turbine wheel 42-2. Also, the opening into the flow control device 44 may be modulated via the valve 46 to adjust or vary the flow of post-combustion gasses 32 through the first turbine housing 40-4, thus varying the amount of overlap between operation of the low- and high-flow turbochargers 40, 42. Also, the relative sizes of the first and second turbine housings 40-4, 42-4 are selected to vary the operation transition point between the low-flow turbine wheel 40-2 and high-flow turbine wheel 42-2. Accordingly, the opening into the chamber 48 of the valve 46 can also be controlled to effect sequential operation of the two turbochargers 40, 42. Through such an arrangement, the flow control device 44 is configured to selectively direct the post-combustion gasses 32 to the low-flow turbocharger 40 and the high-flow turbocharger 42, thus effectively transitioning between the low-flow turbocharger and the high-flow turbocharger during operation of the engine 16.

The vehicle 10 may additionally include a programmable controller 50 configured to regulate operation of the engine 16, such as by controlling an amount of fuel being injected into the cylinders 22 for mixing and subsequent combustion with the pressurized airflow 38. The controller 50 may be a dedicated controller for the engine 16, a controller for the powertrain 12, or a central processing unit for the entire vehicle 10. The controller 50 includes a memory, at least some of which is tangible and non-transitory. The memory may be any recordable medium that participates in providing computer-readable data or process instructions. Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 50 may also include a floppy disk, a flexible disk, hard disk, magnetic tape, any other magnetic medium, a CD-ROM, DVD, any other optical medium, etc. The controller 50 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 50 or accessible thereby may be stored in the memory and automatically executed to provide the required functionality.

The controller 50 is also configured to regulate the flow control device 44. More particularly, the controller 50 is programmed to close the flow control device 44 (as shown in FIG. 3) to direct the post-combustion gasses 32 to the low-flow turbocharger 40 and open the flow control device (as shown in FIG. 4) to direct the post-combustion gasses to the high-flow turbocharger 42 depending on operating parameters, such as the load, temperature, and rotational speed, of the engine 16. Accordingly, the controller 50 may be programmed to close the flow control device 44 below a predetermined flow rate 52 of the post-combustion gasses 32 and open the flow control device at or above the predetermined flow rate. The predetermined flow rate 52 of the post-combustion gasses 32 may be a specific flow rate value below which the post-combustion gasses of the subject engine 16 have sufficient energy to spin the low-flow turbocharger 40 up at a desired rate in order to provide the desired boost pressure within a desired timeframe, but insufficient to similarly spin up the higher inertia high-flow turbocharger 42. The subject predetermined flow rate 52 of the post-combustion gasses 32 may be identified through calculations and then verified through an empirical procedure during testing of the actual engine 16, both on a test stand and in the vehicle 10.

The controller 50 is also configured to coordinate operation of the flow control device 44 with operation of the first mechanism 28 to additionally improve operating efficiency of the engine 16 during particular engine operating modes. Specifically, the controller 50 selects a first predetermined timing 54 for opening the exhaust valves 26 via the first mechanism 28, and directs the post-combustion gasses 32 to the low-flow turbocharger 40 via the flow control device 44 when the engine 16 operates in a "first mode". The subject first mode is herein defined as engine operation below a predetermined engine speed 56 and above a predetermined engine load 58. In the first mode of engine operation, high engine load at low RPM generates elevated pressure inside the combustion chambers 22-2, and together with exhaust gas residuals trapped within the combustion chambers following completion of the exhaust stroke, increase the likelihood of knock or detonation due to uncontrolled combustion. The first mode of engine operation may be encountered when, for example, the engine 16 receives full-, i.e., a wide-open, throttle 19, at a low engine speed, such as around and below 2,000RPM. The first predetermined timing 54 includes a reduced duration of time the exhaust valves 26 stay open relative to the entire exhaust cycle, as defined by the rotation of crankshaft 30. Such reduced duration of time the exhaust valves 26 stay open results in fewer exhaust gas residuals trapped within the combustion chambers 22-2 following completion of the exhaust stroke in each respective cylinder 22, thus reducing the likelihood of knock. The first predetermined engine speed 56 may be set around 3,000 RPM, while the first predetermined engine load 58 may be identified by a specific opening of the throttle 19, such as a 30-80% opening, as a function of engine speed.

Additionally, the controller 50 selects a second predetermined timing 60 for opening the exhaust valves 26 via the first mechanism 28, and directs the post-combustion gasses 32 to the high-flow turbocharger 42 via the flow control device 44 when the engine 16 operates in a "second mode". The subject second mode is herein defined as engine operation at or above the predetermined engine speed 56. In the second mode of engine operation, the increased engine speed, regardless of engine load, reduces the amount of exhaust gas residuals trapped within the combustion chambers 22-2 following completion of the exhaust stroke, and, therefore, reduces the likelihood of knock. As compared to the second predetermined timing 60, the first predetermined timing 54 for opening the exhaust valves 26 would trap a reduced amount of post-combustion gasses 32 in the cylinder 22 at lower engine speeds. The second predetermined timing 60, however, tends to improve engine breathing at higher engine speeds, and thus improves engine efficiency and power output. Accordingly, the second predetermined timing 60 is used at higher engine speeds of the second mode. The subject second mode of engine operation may be encountered when, for example, the engine 16 is given either part- or full-throttle at higher engine speeds, such as above 3,000 RPM.

The controller 50 may also be configured to direct the post-combustion gasses 32 to the high-flow turbocharger 42 via the flow control device 44 and select the second predetermined timing 60 for opening the exhaust valves 26 via the first mechanism 28 when the engine 16 operates in a "third mode". The subject third mode is herein defined as engine operation below the predetermined speed 56 and below the predetermined load 58. In the third mode of engine operation, the lower engine load generates commensurately lower combustion pressures inside the combustion chambers 22-2, as compared with the first mode, and, therefore, despite the reduced engine speed, the likelihood of knock is reduced. Accordingly, the increased duration of the exhaust valves 26 being open does not cause the engine 16 to knock, while reduced exhaust backpressure caused by the longer exhaust duration will tend to increase engine operating efficiency.

The controller 50 may be additionally configured to select a first predetermined timing 62 for opening the intake valves 24 via the second mechanism 29 when the engine 16 operates in each of the first and second modes. The first predetermined timing 62 includes an increased duration of time the intake valves 24 stay open further into the compression cycle, as defined by the rotation of crankshaft 30, relative to the common practice of keeping the intake valves open in the early part of the compression stroke. Such increased duration of time the intake valves 26 stay open in the first mode results in reduced extent of compression of air trapped within the combustion chambers 22-2 by the respective pistons 22-1 and a lower volume of air trapped within the combustion chambers in each respective cylinder 22, thus reducing combustion pressures and the likelihood of knock. Accordingly, in the first mode, the predetermined timing 62 reduces the likelihood of knock in the combustion chambers 22-2 further, as compared with employing the first predetermined timing 54 for opening the exhaust valves 26 alone. Of additional note, the reduced volume of air trapped within the combustion chambers in each respective cylinder 22 due to the increased duration of time the intake valves 26 stay open can be offset by controlled operation of the low-flow turbocharger 40.

In the second mode, i.e., at high engine speed and load, the first predetermined timing 62 permits the engine 16 to capture more air in the combustion chambers 22-2 and thereby generate enhanced power output. Furthermore, the controller 50 may select a second predetermined timing 64 for opening the intake valve 24 via the second mechanism 29 when the engine 16 operates in the third mode. The second predetermined timing 64 includes a reduced duration of time the intake valves 24 stay open in order to increase compression in the combustion chambers 22-2, which tends to improve combustion stability during engine operation below the predetermined speed 56 and below the predetermined load 58. Consequently, the first predetermined timing 62 traps a lesser amount of post-combustion gasses 32 in the cylinders 22 in the first mode and generates increased power output in the second mode, as compared to using the second predetermined timing 64 in the respective operating modes.

Figure 5:
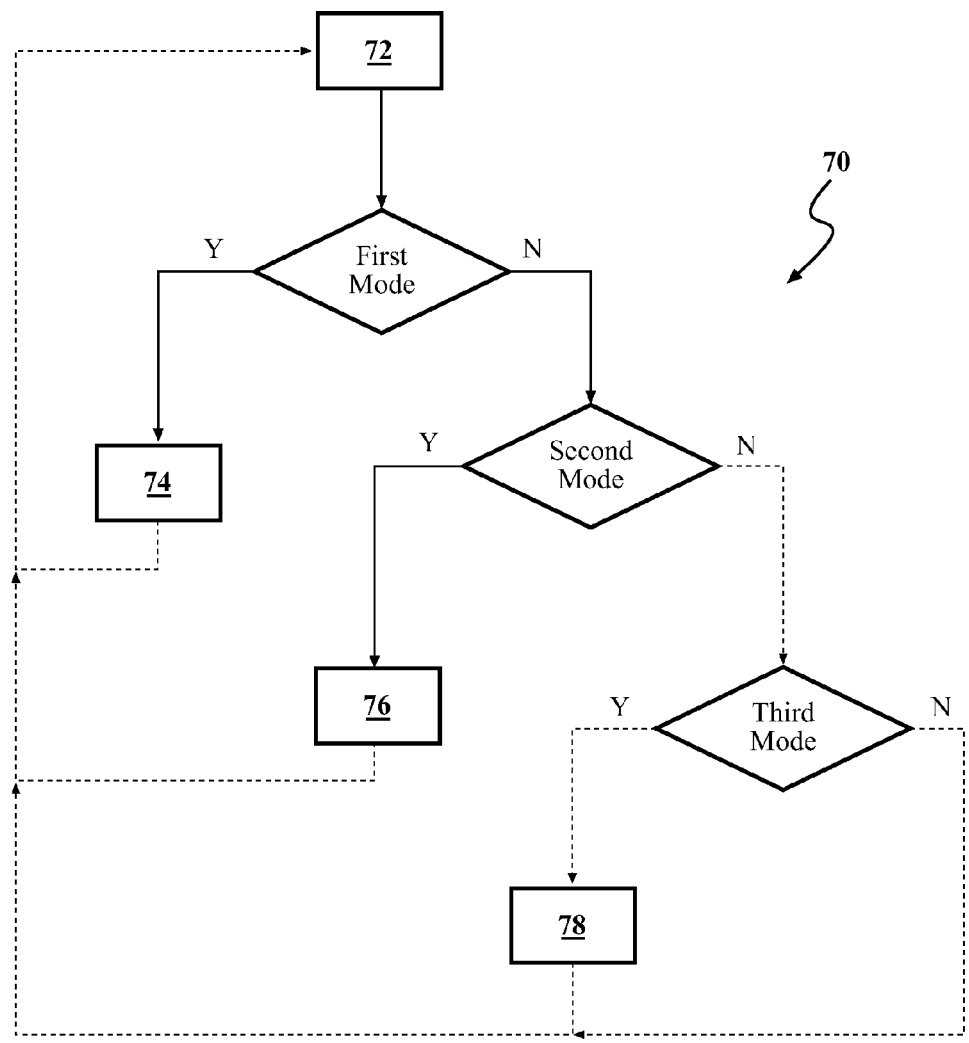
FIG. 5 schematically illustrates, in flow chart format, a method of controlling operation of the internal combustion engine shown in FIGS. 1-3.

FIG. 5 depicts a method 70 of controlling operation of the internal combustion engine 16 described above with respect to FIGS. 1-4. Method 70 commences in frame 72 with the engine 16 operating and generating power. From frame 72 the method advances to frame 74. In frame 74 the method includes directing via the controller 50 the post-combustion gasses 32 to the low-flow turbocharger 40 via the flow control device 44. In frame 74 the method also includes selecting the first predetermined timing 54 for opening the exhaust valves 26 via the first mechanism 28 when the engine 16 operates in the first mode. In frame 74 the method may additionally include selecting by the controller 50 the first predetermined timing 62 for opening the intake valves 24 via the second mechanism 29 when the engine 16 operates in each of the first and second modes.

Alternatively, from frame 72 the method advances to frame 76. In frame 76 the method includes directing the post-combustion gasses 32 to the high-flow turbocharger 42 via the flow control device 44 and selecting via the controller 50 a second predetermined timing 60 for opening the exhaust valves 26 via the first mechanism 28 when the engine 16 operates in the second mode. Additionally, in frame 76 the method may include selecting by the controller 50 the first predetermined timing 62 for opening the intake valves 24.

The method may also proceed from frame 72 to frame 78. In frame 78 the method may include directing by the controller 50 the post-combustion gasses 32 to the high-flow turbocharger 42 via the flow control device 44 and selecting the second predetermined timing 60 for opening the exhaust valves 26 via the first mechanism 28 when the engine 16 operates in the third mode. Additionally, in frame 78 the method may include selecting by the controller 50 the second predetermined timing 64 for opening the intake valves 24 via the second mechanism 29. Following either the frame 74, 76, or 78 the method may return to frame 72 for continuous control of the internal combustion engine 16 while the engine is operating and generating power.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An internal combustion engine comprising:
a cylinder block defining a cylinder;
a cylinder head mounted to the cylinder block;
a reciprocating piston arranged inside the cylinder;
a crankshaft arranged in the cylinder block and rotated by the piston;
an intake valve operatively connected to the cylinder head and configured to control delivery of air to the cylinder for combustion therein;
an exhaust valve operatively connected to the cylinder head and configured to control removal of post-combustion gas from the cylinder;
a first mechanism configured to provide variable timing for the exhaust valve;
a turbocharging system configured to pressurize the air being received from the ambient for delivery to the cylinder, the turbocharging system including a low-flow turbocharger and a high-flow turbocharger each configured to be driven by the post-combustion gas, and a flow control device configured to selectively direct the post-combustion gas to the low-flow and high-flow turbochargers; and
a controller configured to direct the post-combustion gas to the low-flow turbocharger via control of the flow control device and select a first predetermined timing for opening the exhaust valve via control of the first mechanism when the engine operates in a first mode, defined as engine operation below a predetermined speed and above a predetermined load, and direct the post-combustion gas to the high-flow turbocharger via control of the flow control device and select a second predetermined timing for opening the exhaust valve via control of the first mechanism when the engine operates in a second mode, defined as engine operation at or above the predetermined speed, wherein the first predetermined timing for opening the exhaust valve traps less post-combustion gas in the cylinder as compared to the second predetermined timing for opening the exhaust valve.

2. The engine of claim 1, wherein the first mechanism includes an exhaust camshaft configured to regulate opening and closing of the exhaust valve, and is configured to provide the variable timing via at least one of varying opening phasing and opening duration for the exhaust valve.

3. The engine of claim 2, wherein the first mechanism also includes an exhaust camshaft phaser, and wherein the first mechanism is configured to regulate the opening phasing for the exhaust valve by changing a position of the exhaust camshaft via the exhaust camshaft phaser relative to a position of the crankshaft.

4. The engine of claim 2, wherein the exhaust camshaft includes a first cam lobe configured to provide the first predetermined timing for opening the exhaust valve via a first exhaust valve opening duration and a second cam lobe configured to provide the second predetermined timing for opening the exhaust valve via a second exhaust valve opening duration.

5. The engine of claim 4, wherein the first mechanism additionally includes a rocker arm having a first surface configured to actuate the exhaust valve via the first cam lobe and a second surface configured to actuate the exhaust valve via the second cam lobe.

6. The engine of claim 1, wherein the controller is additionally configured to direct the post-combustion gas to the high-flow turbocharger via control of the flow control device and select the second predetermined timing for opening the exhaust valve via the first mechanism when the engine operates in a third mode, defined as engine operation below the predetermined speed and below the predetermined load.

7. The engine of claim 6, wherein the engine additionally includes a second mechanism configured to provide variable timing for the intake valve, and the controller is additionally configured to select a first predetermined timing for opening the intake valve via control of the second mechanism when the engine operates in each of the first and second modes, and select a second predetermined timing for opening the intake valve via the second mechanism when the engine operates in the third mode, wherein the first predetermined timing for opening the intake valve traps less air in the cylinder in the first mode and generates enhanced engine power output in the second mode as compared to the second predetermined timing for opening the intake valve.

8. The engine of claim 7, wherein the second mechanism is configured to provide the variable timing via varying at least one of opening phasing and opening duration for the intake valve.

9. The engine of claim 8, further comprising an intake camshaft configured to regulate opening and closing of the intake valve, and wherein the second mechanism includes an intake camshaft with an intake camshaft phaser and is configured to regulate the opening phasing for the intake valve by changing a position of the intake camshaft via the intake camshaft phaser relative to a position of the crankshaft.

10. The engine of claim 8, wherein the second mechanism is an intake camshaft having a first cam lobe configured to provide the first predetermined timing for opening the intake valve via a first intake valve opening duration and a second cam lobe configured to provide the second predetermined timing for opening the intake valve via a second intake valve opening duration.

11. A method of controlling operation of an internal combustion engine having:
   a cylinder block defining a cylinder;
   a cylinder head mounted to the cylinder block;
   a reciprocating piston arranged inside the cylinder;
   a crankshaft arranged in the cylinder block and rotated by the piston;
   an intake valve operatively connected to the cylinder head and configured to control delivery of air to the cylinder for combustion therein;
   an exhaust valve operatively connected to the cylinder head and configured to control removal of post-combustion gas from the cylinder;
   a first mechanism configured to provide variable timing for the exhaust valve; and
   a turbocharging system configured to pressurize the air being received from the ambient for delivery to the cylinder, the turbocharging system including a low-flow turbocharger and a high-flow turbocharger, each turbocharger configured to be driven by the post-combustion gas, and a flow control device configured to selectively direct the post-combustion gas to the low-flow and high-flow turbochargers;
   the method comprising:
      directing, by a controller configured to regulate operation of the engine, the post-combustion gas to the low-flow turbocharger via control of the flow control device, and selecting via the controller a first predetermined timing for opening the exhaust valve via control of the first mechanism when the engine operates in a first mode, defined as engine operation below a predetermined speed and above a predetermined load; and
      directing by the controller the post-combustion gas to the high-flow turbocharger via control of the flow control device, and selecting via the controller a second predetermined timing for opening the exhaust valve via control of the first mechanism when the engine operates in a second mode, defined as engine operation at or above the predetermined speed;
      wherein the first predetermined timing for opening the exhaust valve traps less post-combustion gas in the cylinder as compared to the second predetermined timing for opening the exhaust valve.

12. The method of claim 11, wherein the first mechanism includes an exhaust camshaft configured to regulate opening and closing of the exhaust valve and is configured to provide the variable timing via at least one of varying opening phasing and opening duration for the exhaust valve.

13. The method of claim 12, wherein the first mechanism also includes an exhaust camshaft phaser, the method further comprises regulating the opening phasing for the exhaust valve via control of the first mechanism by changing a position of the exhaust camshaft via the exhaust camshaft phaser relative to a position of the crankshaft.

14. The method of claim 12, wherein the exhaust camshaft includes a first cam lobe configured to provide the first predetermined timing for opening the exhaust valve via a first exhaust valve opening duration and a second cam lobe configured to provide the second predetermined timing for opening the exhaust valve via a second exhaust valve opening duration, the method further comprises regulating the first mechanism to selectively provide the first and the second exhaust valve opening duration.

15. The method of claim 14, wherein the first mechanism additionally includes a rocker arm having a first surface configured to actuate the exhaust valve via the first cam lobe and a second surface configured to actuate the exhaust valve via the second cam lobe.

16. The method of claim 11, further comprising directing by the controller the post-combustion gas to the high-flow turbocharger via control of the flow control device and selecting the second predetermined timing for opening the exhaust valve via control of the first mechanism when the engine operates in a third mode, defined as engine operation below the predetermined speed and below the predetermined load.

17. The method of claim 16, wherein the engine additionally includes a second mechanism configured to provide variable timing for the intake valve, further comprising selecting by the controller a first predetermined timing for opening the intake valve via control of the second mechanism when the engine operates in each of the first and second modes, and selecting a second predetermined timing for opening the intake valve via control of the second mechanism when the engine operates in the third mode, wherein the first predetermined timing for opening the intake valve traps less air in the cylinder in the first mode and generates enhanced engine power output in the second mode as compared to the second predetermined timing for opening the intake valve.

18. The method of claim 17, wherein the second mechanism is configured to provide the variable timing via varying at least one of opening phasing and opening duration for the intake valve.

19. The method of claim 18, wherein the engine includes an intake camshaft configured to regulate opening and closing of the intake valve, and the second mechanism includes an intake camshaft with an intake camshaft phaser and is configured to regulate the opening phasing for the intake valve by changing a position of the intake camshaft via the intake camshaft phaser relative to a position of the crankshaft, the method further comprises regulating the opening phasing for the intake valve via control of the second mechanism by changing the position of the intake camshaft via the intake camshaft phaser relative to the position of the crankshaft.

20. The method of claim 18, wherein the second mechanism is an intake camshaft having a first cam lobe configured to provide the first predetermined timing for opening the intake valve via a first intake valve opening duration and a second cam lobe configured to provide the second predetermined timing for opening the intake valve via a second intake valve opening duration, the method further comprises regulating the second mechanism to selectively provide the first and the second intake valve opening duration.

* * * * *